UNITED STATES PATENT OFFICE.

JAMES E. HEWITT, OF NEWARK, NEW JERSEY, ASSIGNOR OF ONE-HALF TO CHARLES T. COE, OF NEW YORK, N. Y.

ALLOY.

SPECIFICATION forming part of Letters Patent No. 671,595, dated April 9, 1901.

Application filed February 1, 1900. Serial No. 3,568. (Specimens.)

*To all whom it may concern:*

Be it known that I, JAMES E. HEWITT, a citizen of the United States, and a resident of Newark, in the county of Essex and State of New Jersey, have made and invented certain new and useful Improvements in Alloys, of which the following is a specification.

My invention relates to an improved antifriction lining or bearing metal.

Heretofore it has been practically impossible to combine lead in any considerable quantity with a given quantity of copper, as the two metals would not mix or amalgamate, the lead under such circumstances showing a tendency to leave the copper. As far as I am aware to a given quantity of copper not more than half that quantity of lead could be added and thoroughly commingled; but after many and numerous experiments I have succeeded by the aid of certain processes and substances in thoroughly commingling and amalgamating the two metals in whatever proportion desired, even up to equal quantities of each, thus producing an entirely new alloy, capable of a wide and extensive use in the arts and possessing qualities and characteristics not found in any other metal or alloy of which I am aware.

In carrying out my invention I take, for example, fifty-five per cent., by weight, of copper and in a suitable vessel melt the same until it will flow rather freely. When the copper starts to melt, I cover the surface thereof with what I term the "covering-powder," consisting of equal quantities of pulverized charcoal, argol, niter, and limestone, such powder acting as a flux and, further, to prevent oxidation on the surface of the metal during the operation of stirring and mixing. After melting the copper I add thereto a flux in the form of phosphor-tin broken into small parts or pieces and in the proportion of about one-quarter of an ounce to fifty-five ounces of copper. I prefer to use phosphor-tin in order to secure the small percentage of tin, which I find improves the alloy, as it renders it slightly harder and tougher than would otherwise be the case. If desired to still more toughen and harden the metal, block-tin may be added in small quantities, from one to ten per cent., in accordance with the use to which the metal is to be put. During and after adding the flux I constantly stir the metal in order to thoroughly and equally distribute said flux throughout the same, the charcoal of the covering-powder of course remaining on the surface of the molten metal. I then add to the above about forty-four parts of metallic lead, the latter being first cut or otherwise divided into small pieces or portions. The lead is added gradually, the mass being constantly stirred in order to thoroughly and intimately mix and combine the metals and cause a thorough amalgamation, and thus effect a homogeneous and perfect alloy. The lead as it is added will of course gradually reduce the temperature of the copper until finally when the entire quantity is added the temperature of the mass will be but slightly above the melting-point of the lead—that is, slightly above 612° Fahrenheit.

In the production of my new metal the covering-powder is an element of much importance and thereon largely depends the success in forming the alloy. As before described, this powder consists of about equal proportions of pulverized charcoal, niter, argol, and limestone, the limestone containing a large percentage of silica and magnesium. It must be understood that in the use of lime pure lime or, more properly speaking, oxid of calcium will not suffice. It is essential that such limestone or carbonate of lime be used as contains a large percentage of magnesium and silicon, such materially assisting in the perfection of the alloy in that they act as a flux. It will be understood, of course, that the office or function of the charcoal in this powder is to take up or absorb the carbonic-acid gas of the atmosphere, which would otherwise be taken up by the metal, and thus render it more or less brittle, that the office or function of the niter is to impart to the metal the nitrate of potash in that special form, and that the function of the argol is to furnish the metal with the potassium which it contains in a peculiar state of combination. In this powder, therefore, we secure as fluxes the following metals: nitrate of potassium from the niter, tartrate of potassium from the argol, and silica, magnesium, and carbonate of lime from the limestone.

It will of course be understood that my invention is not limited to the proportions of metals above specified, the gist of the invention lying in the fact that by using the materials specified and in the manner described an alloy may be formed wherein the lead and copper are combined in any desired proportions—that is, in equal quantities or either the lead in excess of the copper or the copper in excess of the lead—and thus producing a lining metal, a Babbitt metal, or bronze-bearing metal.

For the purpose of illustration I might add that an analysis of my new alloy which I use as a lining metal shows the following proportions: copper, 54.18 per cent.; lead, 45.19 per cent.; tin, .23 per cent.; potassium, nitrate or tartrate, .18 per cent.; phosphorus, carbon, and silica, .22 per cent.

It will be understood that by "phosphor-tin" is meant the article of commerce which is usually sold and known and referred to by that term and which contains, approximately, about twenty parts of phosphorus and seventy-nine parts of tin.

Having fully described my invention, what I claim as new, and desire to secure by Letters Patent, is—

1. An alloy consisting principally of lead and copper in substantially equal proportions, and containing a small percentage of phosphorus and tin.

2. An alloy consisting principally of lead and copper, and containing a small percentage of potassium, phosphorus, tin, carbon and silica.

3. The method of forming the alloy hereinbefore described, consisting in combining lead and copper with a small percentage of phosphorus and tin in a molten condition, the metals when in such condition being covered with a powder containing substantially equal parts of limestone, charcoal, niter and argol.

Signed at New York, in the county of New York and State of New York, this 9th day of January, A. D. 1900.

JAMES E. HEWITT.

Witnesses:
WILLIAM MAYNARD,
GEORGE COOK.